(12) United States Patent
Sukenari et al.

(10) Patent No.: US 7,343,091 B2
(45) Date of Patent: Mar. 11, 2008

(54) IMAGING DEVICE

(75) Inventors: Kazuhiro Sukenari, Nagoya (JP); Hiroshi Yamakose, Gifu (JP)

(73) Assignee: Elmo Company, Limited (JP)

( * ) Notice: Subject to any disclaimer, the term of this patent is extended or adjusted under 35 U.S.C. 154(b) by 397 days.

(21) Appl. No.: 11/194,026

(22) Filed: Jul. 28, 2005

(65) Prior Publication Data
US 2006/0110152 A1 May 25, 2006

(30) Foreign Application Priority Data
Nov. 25, 2004 (JP) ............................ 2004-339701

(51) Int. Cl.
*G03B 15/03* (2006.01)
(52) U.S. Cl. ...................... 396/155; 396/428
(58) Field of Classification Search ................. 396/155
See application file for complete search history.

(56) References Cited

U.S. PATENT DOCUMENTS

| 2,823,478 | A | * | 2/1958 | Ostergaard et al. .......... 40/707 |
|---|---|---|---|---|
| 3,139,793 | A | * | 7/1964 | Bradford et al. .............. 353/48 |
| 3,682,540 | A | * | 8/1972 | Oxberry et al. ............... 355/18 |
| 3,900,253 | A | * | 8/1975 | Astero ......................... 353/63 |
| 3,968,575 | A | * | 7/1976 | Van Wilson ................ 434/315 |
| 4,022,526 | A | * | 5/1977 | Badalich et al. .............. 353/78 |
| 4,071,294 | A | * | 1/1978 | Scibilia ....................... 352/72 |
| 4,105,316 | A | * | 8/1978 | Soding et al. .............. 353/109 |
| 4,256,527 | A | * | 3/1981 | Green ........................ 156/443 |
| 2002/0054292 | A1 | * | 5/2002 | Orelli et al. ................ 356/402 |
| 2004/0012827 | A1 | * | 1/2004 | Fujinawa et al. ........... 358/474 |
| 2004/0233325 | A1 | * | 11/2004 | Lee et al. ................... 348/375 |
| 2005/0168627 | A1 | * | 8/2005 | Yi et al. ..................... 348/373 |

FOREIGN PATENT DOCUMENTS

JP 2004-274503 9/2004

* cited by examiner

*Primary Examiner*—W. B. Perkey
*Assistant Examiner*—Warren K Fenwick
(74) *Attorney, Agent, or Firm*—Ostrolenk, Faber, Gerb & Soffen, LLP

(57) ABSTRACT

To provide an imaging device that can use a single illumination device to offer a light source suitable for imaging a translucent target object, while also enabling the imaging device to be mounted on a platform such as a desk.

In case of slide film imaging, an illumination unit holding arm 150 is rotated into a position at a table side and an illumination unit 130 is brought into a sub illuminating attitude where the illumination unit 130 is laid over a top surface of the table 110. On that condition, a film stage 200 is mounted on the table 110 in a manner opposed to a camera head 120, and front end of a stage 202 is overlapped with and engaged to upper end of a casing of the illumination unit 130 that takes the sub illuminating attitude. Light irradiated by the illumination unit 130 in this state enters a region under the stage 202 of the film stage 200, goes through an opening 210 of the stage 202, and at last reaches the camera head 120.

10 Claims, 11 Drawing Sheets

IMAGING DEVICE

CLAIM OF PRIORITY

The present application claims priority from Japanese Application P2004-339701 filed on Nov. 25, 2004, the content of which is hereby incorporated by reference into this application.

BACKGROUND OF THE INVENTION

Description of the Related Art

The present invention relates to an imaging device that images a target object mounted on a table.

In order to compensate for insufficiency of light quantity at the time of imaging the target object mounted on the table by using a camera head, the imaging device of this type employs an illumination unit to illuminate the target object on the table. The imaging device also employs arms to respectively hold the camera head and the illumination unit with respect to the table or employs a holding arm for the camera head to also hold the illumination unit. The use of the holding arm(s) is disclosed in, for example, Japanese Patent Laid-open Gazette No. 2004-274503.

Such imaging device not only needs to image a target object mounted on a top surface of the table but also needs to image a translucent target object such as a slide film. In an imaging device disclosed in the above-mentioned Patent Document, an illumination unit can be located below a table and can irradiate light from below the table toward a camera head. This arrangement makes the imaging device adaptable to the imaging of translucent target object.

However, in the imaging device proposed by the above-mentioned Patent Document, the table needs to have a large height for convenience of rotating the illumination unit into a position below the table. The imaging device of such arrangement is not suitable to be mounted on a platform such as a desk. In order to enable the device to image a translucent target object such as a slide film while also enabling the device to be mounted on a platform, it is necessary to build another illumination device into the table and make it function as a backlight for illuminating the translucent target object from the table side, in addition to the illumination device that illuminates the table top surface. The addition of such illumination device not only complicates the device configuration but also gives rise to a need for cumbersome switching operations between the illuminations.

The present invention is designed to solve the problem stated above, and is purposed to provide an imaging device that can use a single illumination device to offer a light source suitable for imaging a translucent target object, while also enabling the imaging device to be mounted on a platform such as a desk.

SUMMARY OF THE INVENTION

In order to solve at least a part of the problem stated above, an imaging device of the present invention includes a camera head that images an imaging-area of a table and an illumination unit that illuminates the imaging-area, and holds the illumination unit with respect to the table by means of an illumination unit holding arm. The illumination unit holding arm enables the illumination unit to take and irradiate light in a main attitude where the illumination unit illuminates the imaging-area from above the table and a sub attitude where the illumination unit gets close to a top surface of the table.

When the illumination unit takes the sub attitude that is close to the top surface of the table, a stage forming member may be mounted on the table in a manner opposed to the camera head, and the illumination unit in the sub attitude may irradiate interior of the stage forming member with light. The stage forming member forms a stage, on which an imaging-object can be laid, apart from a top surface of the table, and the stage includes a translucent portion that allows for transmission of light. Therefore, the light that is irradiated by the illumination unit in the sub attitude toward the interior of the stage forming member can be used as a backlight for illuminating the translucent portion from below. This arrangement allows for illumination of a translucent imaging-object laid on the translucent portion of the stage forming member from below and thus allows for imaging of the translucent imaging-object by the camera head. According to the imaging device of the present invention, only a single illumination unit is sufficient to provide the illumination for illuminating an imaging-object from above the table as well as the backlight for illuminating a translucent imaging-object from below. Furthermore, as for the illumination unit holding arm that holds the illumination unit, all that is required is to hold the illumination unit in the main attitude and the sub attitude above the table, but not to rotate the illumination unit into any position below the table. The imaging device of the present invention thus can be mounted on a platform such as a desk.

The imaging device of the present invention described above can be implemented into a variety of aspects. For example, an interior wall of the stage forming member may be configured to be light-scattering and the illumination unit may be configured to allow light irradiated by an illumination window (i.e. illumination light) to go through the translucent portion toward the camera head. In this way, a sufficient amount of light can be assured for light that illuminates the imaging-object laid on the translucent portion of the stage from below and reaches the camera head, while a sufficient amount of light is also assured in a region under the translucent portion of the stage forming member. Therefore, the translucent imaging-object can be imaged with a sufficient amount of light.

In addition, the stage forming member may be engaged to the illumination unit that takes the sub attitude and may surround the region under the translucent portion in cooperation with the illumination unit. In this way, the light irradiated from the illumination unit can be used more effectively in imaging a translucent imaging-object.

The present invention is also applicable as a stage for slide film imaging, which is used in the imaging device to image a slide film. That is, the stage for slide film imaging includes:

a body that is mounted on the table in a manner opposed to the camera head and forms a stage, on which an imaging-object can be laid, at the body top such as apart from a top surface of the table, the body having a lateral opening that is formed on a side surface of the body and is used to guide light into interior of the body; and a recess that is formed in the stage and can have a slide film mounted therein, the recess having a recess opening that is formed in the recess and can expose at least a film area of the slide film;

wherein the body engages to the illumination unit that irradiates light at a position close to the top surface of the table, and surrounds a region under the recess opening in cooperation with the illumination unit, thereby causes the light irradiated by the illumination unit to enter the interior of the body through the lateral opening.

The stage for slide film imaging of this configuration can be mounted on the table of the imaging device in a manner opposed to the camera head. This immediately enables the device to perform the slide film imaging.

Furthermore, depressions deeper than the recess may also be formed at both sides of the recess opening in the stage in a manner continuous with the recess. This enables a user of the device to insert his (her) fingers in the depressions and grab the slide film already set in the recess, and thus makes the attachment and detachment of the slide film simple and convenient.

DESCRIPTION OF THE PREFERRED EMBODIMENTS

Figure 1:
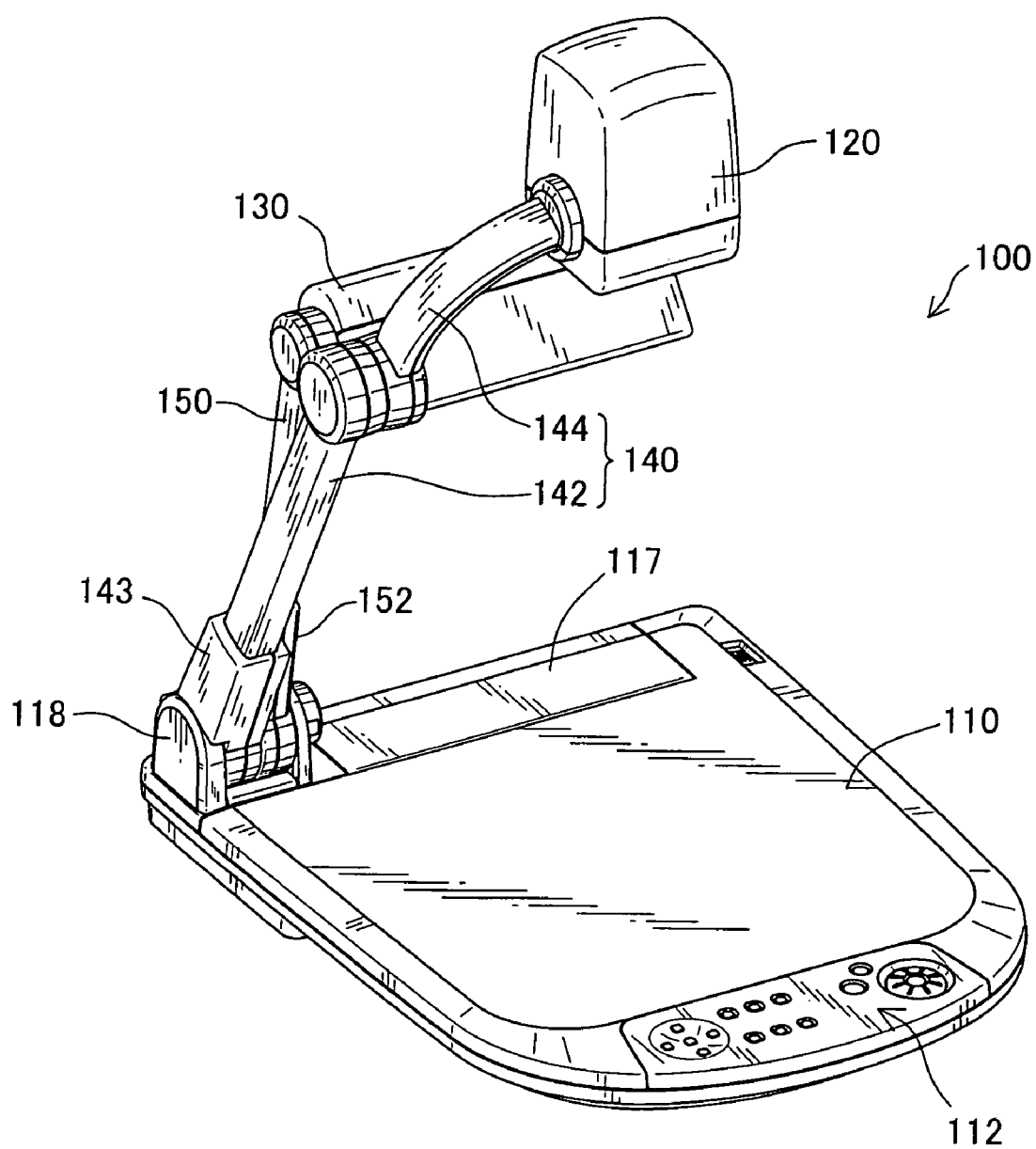
FIG. 1 is a perspective view of an imaging device 100 of an embodiment.
Figure 2:
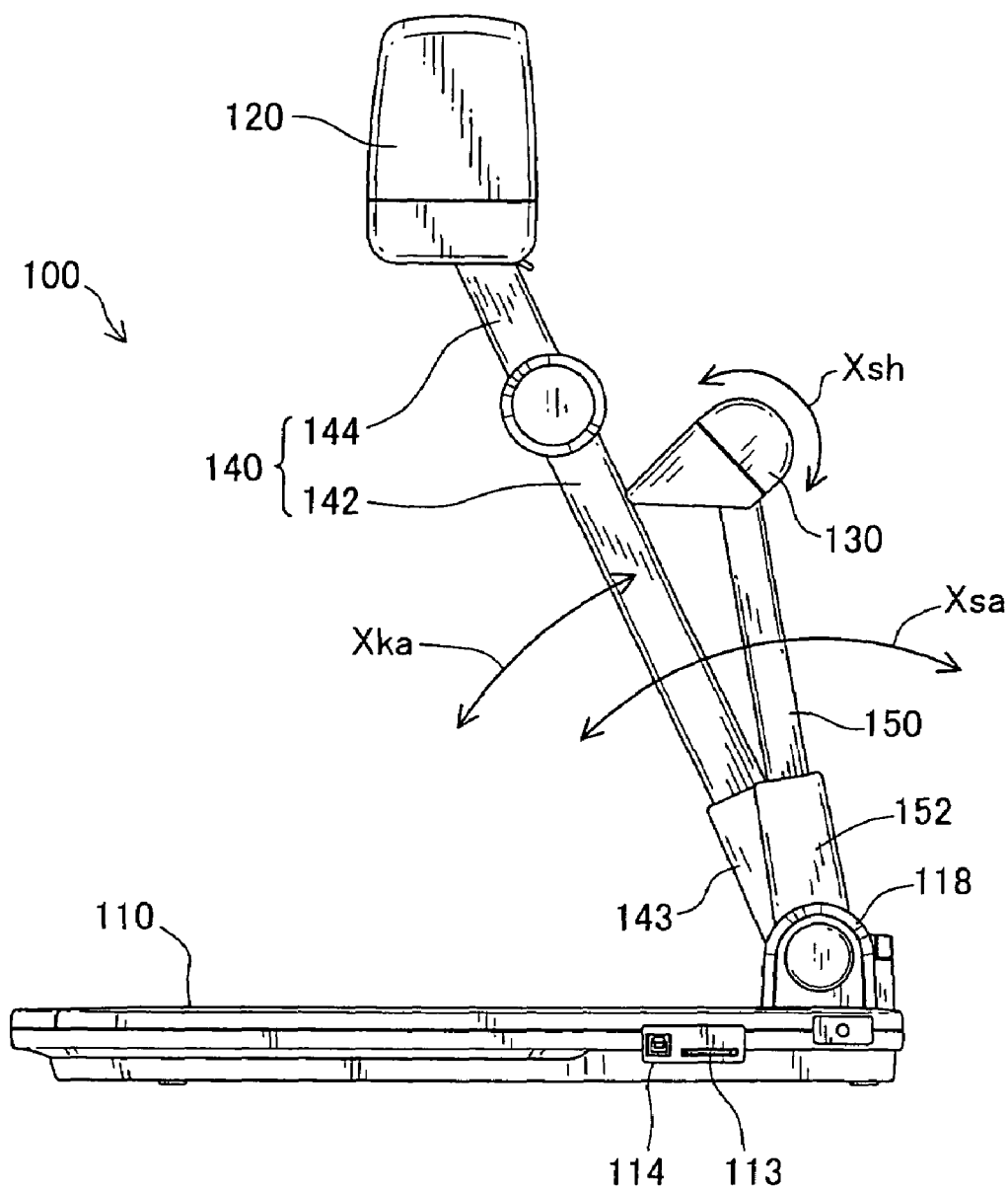
FIG. 2 is a right side view of the imaging device 100.

The following describes modes for embodying the present invention in terms of examples based on drawings. FIG. 1 is a perspective view of an imaging device 100 of an embodiment; FIG. 2 is a right side view of the imaging device 100; and FIG. 3 is a rear perspective view of the imaging device 100.

As shown in the drawings, the imaging device 100 includes: a table 110 on which a target object is mounted; a camera head 120 that images the target object (not shown) on the table 110; and an illumination unit 130 that illuminates the target object on the table 110. The table 110 is a square-shaped tablet with a rounded fore side, and has a group of switches 112 on top of the fore side and a memory card slot mechanism 113 and an USB (Universal Serial Bus) terminal 114 at right-rear end of a side wall. The group of switches 112 includes switches for settings such as zoom, auto-focus, iris, and white balance as well as switches such as for setting device functions or for writing memory data. However, details of these switches are not described herein, for they are not immediately related to the scope of the present invention.

Figure 3:
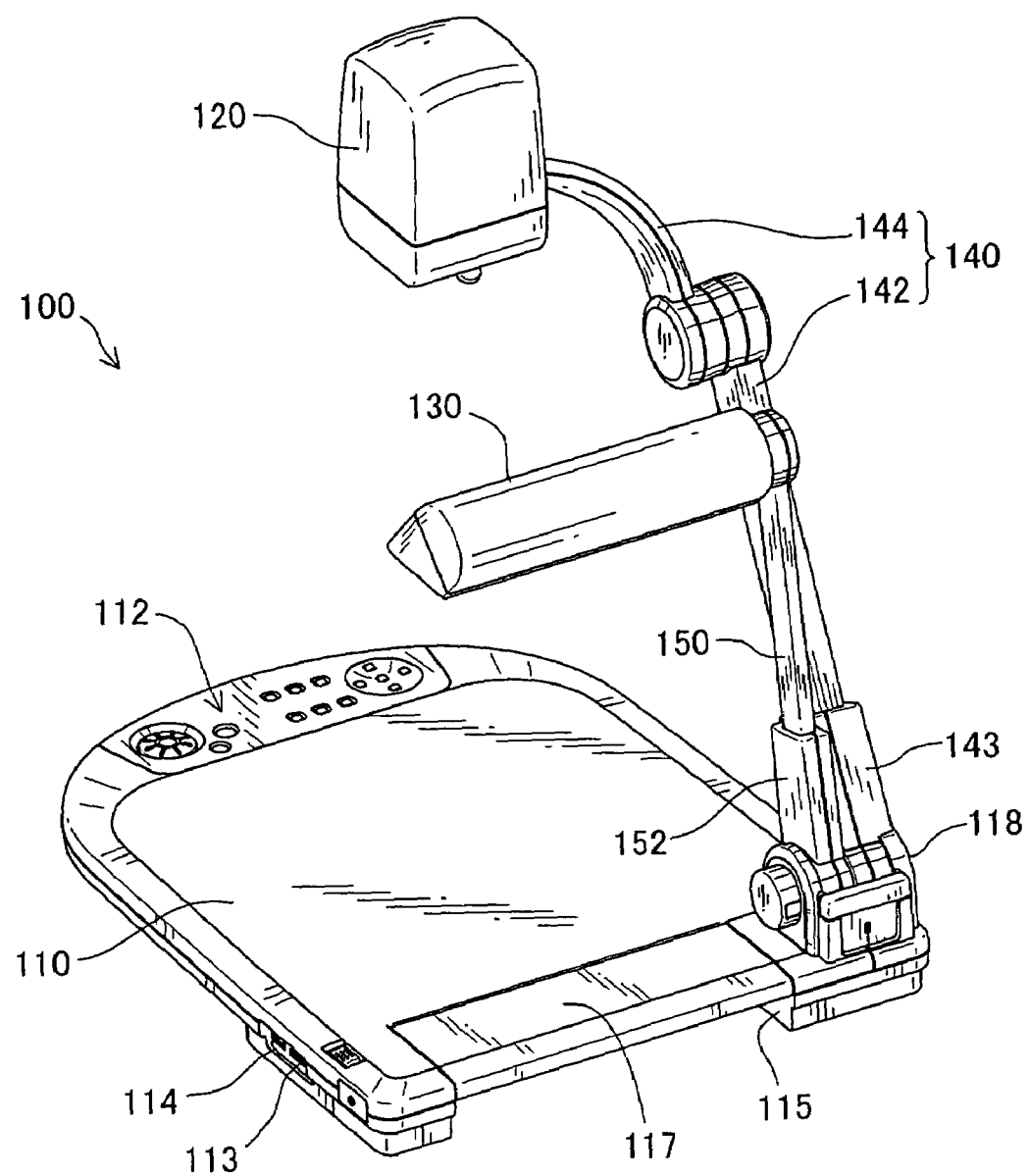
FIG. 3 is a rear perspective view of the imaging device 100.

As shown in FIG. 3, the table 110 further includes a recess 115 that notches a top surface of the table at rear end of the side wall around the table, and uses a cover 117 to cover the recess 115. The cover 117 opens and closes like a flap, and in a closed state shown in FIG. 3, becomes substantially coplanar with the table top surface and makes the cover surface continuous with the table top surface. The recess 115 covered with the cover 117 is configured to provide a space for connector terminals that are used for connection with external devices.

The camera head 120 is held with respect to the table 110 by means of a camera holding arm 140. The camera holding arm 140 includes a table side arm 142 and a camera side arm 144, and is rotatably held to the table 110 at a base 143 of the table side arm 142. The camera side arm 144 is fixedly connected with the camera head 120 and is rotatably connected with the table side arm 142. The camera head 120, therefore, can rotate at leading end of the table side arm 142 in a manner integral with the camera side arm 144.

The illumination unit 130 is held with respect to the table 110 by means of an illumination unit holding arm 150. The illumination unit holding arm 150 is rotatably held to the table 110 at its base 152 and rotatably holds the illumination unit 130 at its leading end.

Figure 4:
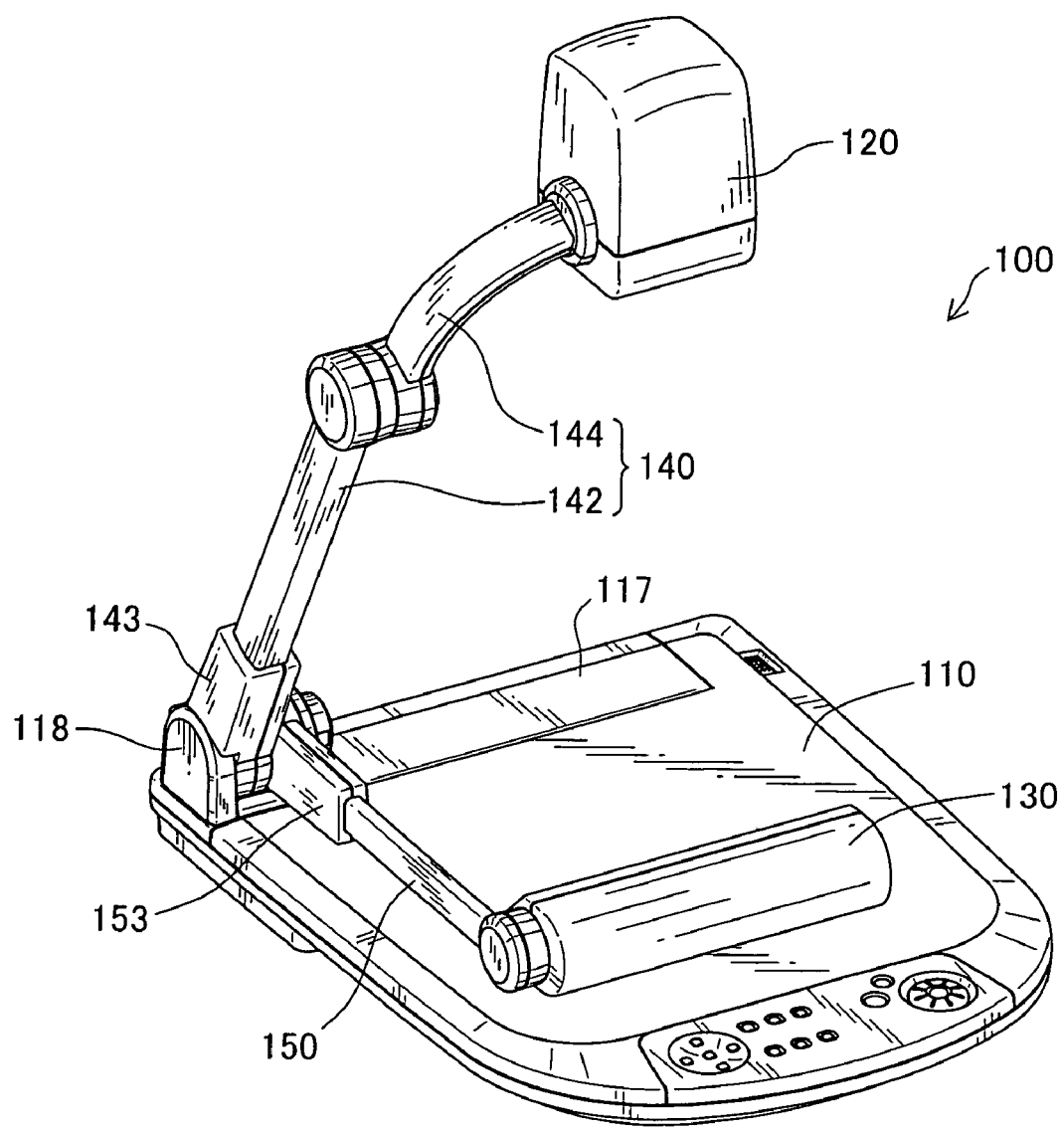
FIG. 4 is a perspective view of the imaging device 100 in preparation for slide film imaging, where an illumination unit holding arm 150 is rotated into a position at a table side.
Figure 5:
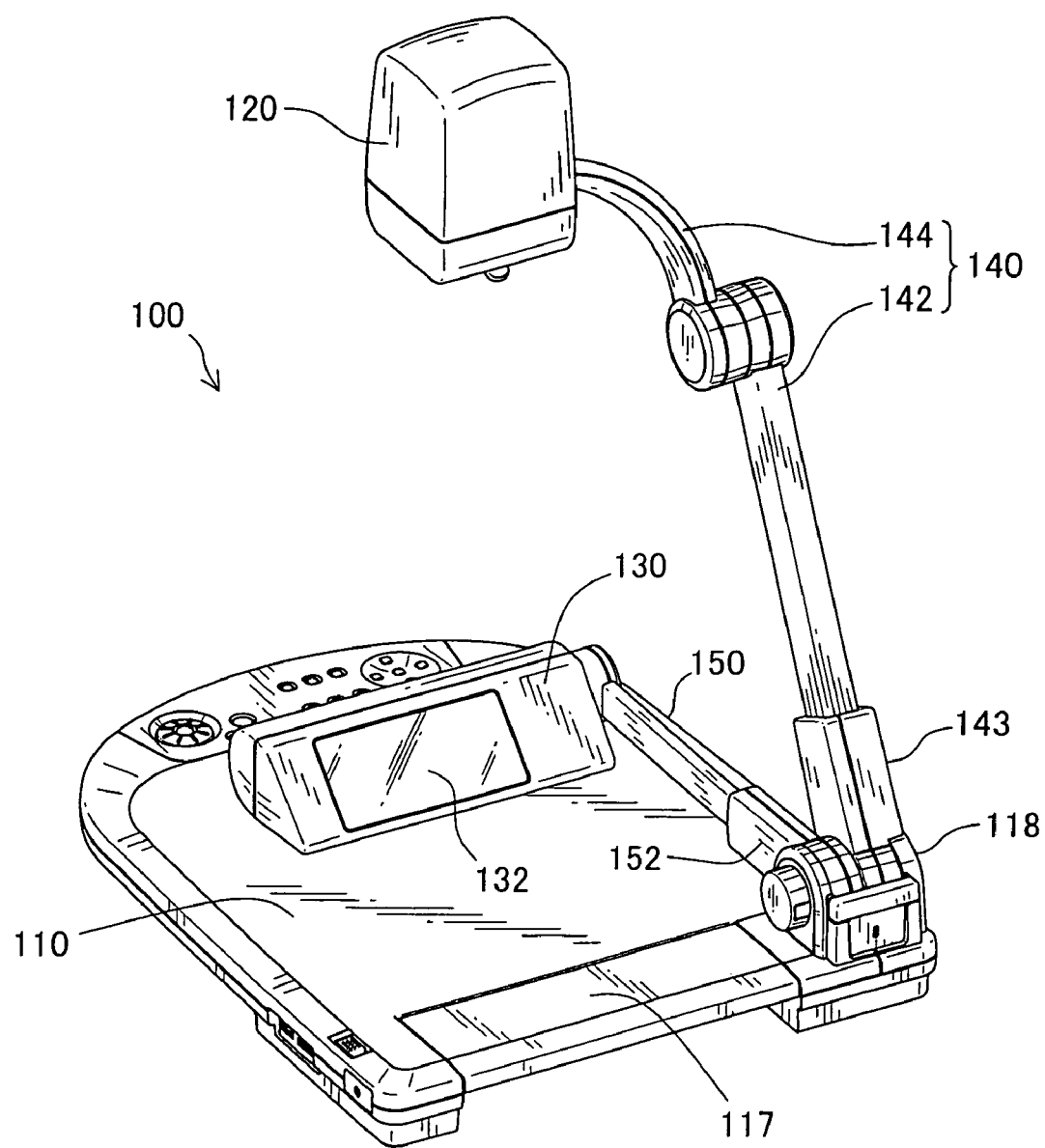
FIG. 5 is a rear perspective view of the imaging device 100 in preparation for slide film imaging.
Figure 6:
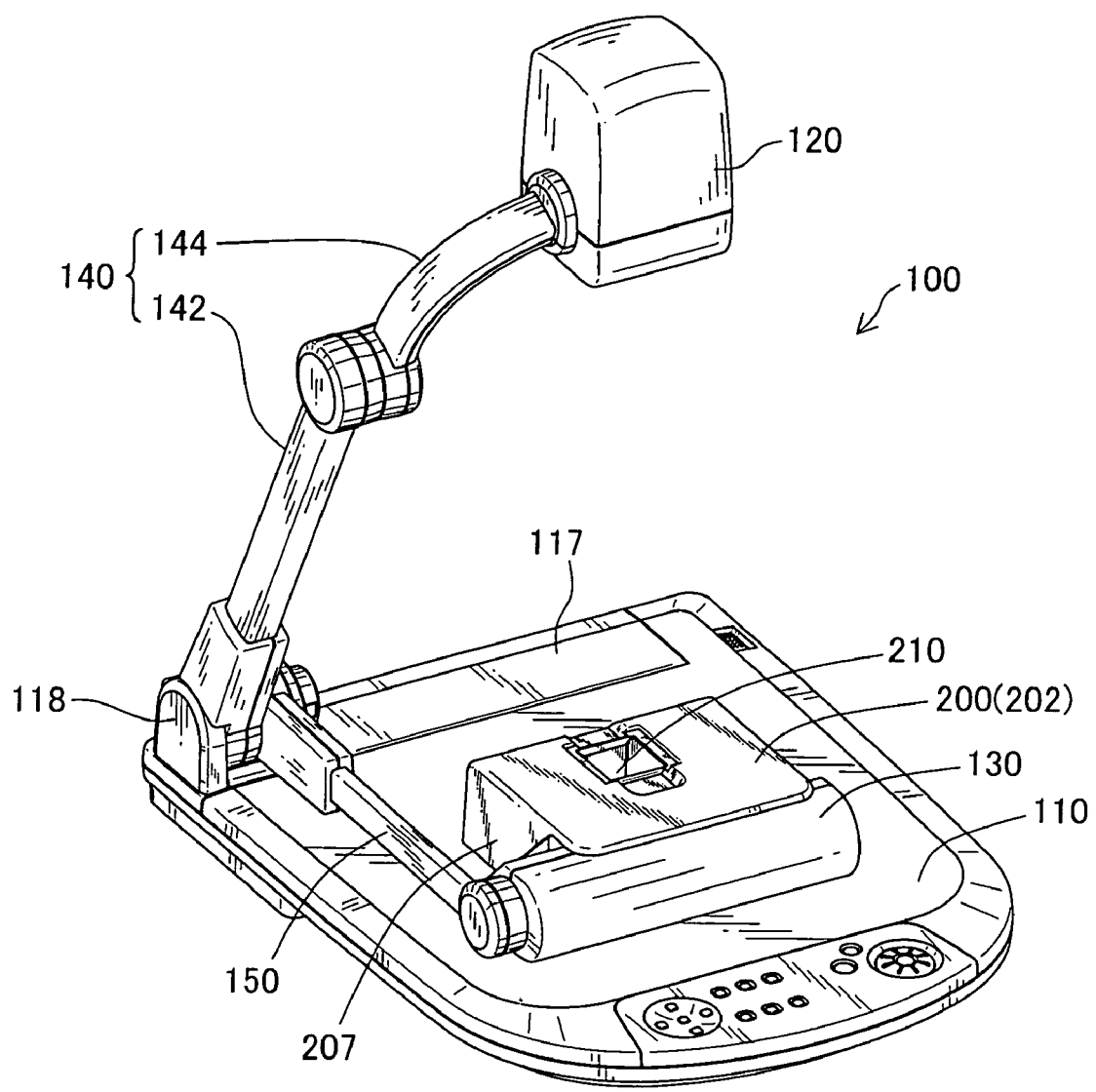
FIG. 6 is a perspective view of the imaging device 100 in a mode of slide film imaging, where a film stage 200 is used in combination.
Figure 7:
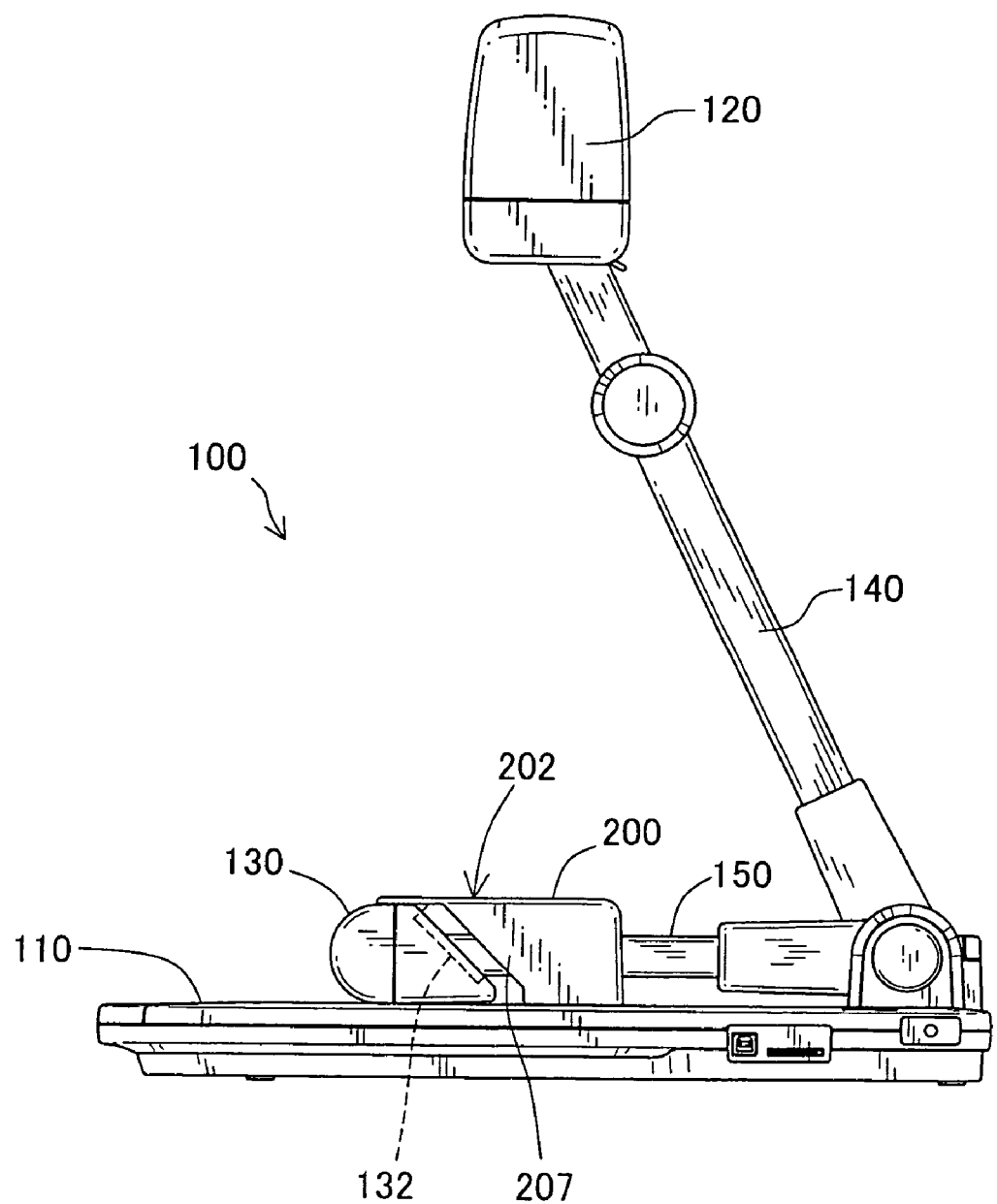
FIG. 7 is a right side view of the imaging device 100 in the mode of slide film imaging, where the film stage 200 is used in combination.

The camera holding arm 140 and the illumination unit holding arm 150 are rotatably and coaxially supported by an elevated portion 118 that is located at an inner-left corner of the table 110, and rotate coaxially with respect to the table 110 so as to vary their degrees of inclinations with respect to the table 110. Having these rotatably and coaxially supported arms, the imaging device 100 can take various modes as the arms rotate. FIG. 4 is a perspective view of the imaging device 100 in preparation for slide film imaging, where the illumination unit holding arm 150 is rotated into a position at the table side; FIG. 5 is a rear perspective view of the imaging device 100 in preparation for slide film imaging; FIG. 6 is a perspective view of the imaging device 100 in a mode of slide film imaging, where a film stage 200 is used in combination; and FIG. 7 is a right side view of the imaging device 100 in the mode of slide film imaging, where the film stage 200 is used in combination.

As can be seen from the above-described details of how the arms and the illumination unit 130 are axially supported, the camera holding arm 140 rotates so as to vary its degree of inclination with respect to the table 110, as indicated by an arrow Xka in FIG. 2, and is rotatable from the mode shown in FIG. 2, FIG. 1, or FIG. 3 to a mode where the camera head 120 gets close to the top surface of the table 110. At the time of imaging the target object mounted on the table 110, the camera head 120 takes an attitude (imaging attitude) shown in FIGS. 1 to 3 and images the target object from above the table. It should be noted herein that, when the camera head 120 takes this imaging attitude, the rotation of the camera holding arm 140 is regulated so that the camera holding arm 140 maintains its attitude at a maximum degree of inclination (maximum inclination) with respect to the table 110.

The illumination unit holding arm 150 rotates so as to vary its degree of inclination with respect to the table 110, as indicated by an arrow Xsa in FIG. 2, and is rotatable from the mode shown in FIG. 2 to a mode where the illumination unit 130 is laid over the top surface of the table 110 as shown in FIGS. 4 to 7. The illumination unit holding arm 150 is also rotatable to a mode where the illumination unit 130 reaches a position posterior to the position shown in FIG. 2. The illumination unit 130 rotates about the connection with the illumination unit holding arm 150 in a manner as indicated by an arrow Xsh in FIG. 2.

At the time a target object mounted on the table 110 is imaged, the illumination unit holding arm 150 is located posterior to the camera holding arm 140, and the illumination unit 130 generally takes an attitude posterior to the camera head 120 (main illuminating attitude, see FIGS. 1 to 3) and illuminates the target object mounted on the table 110 obliquely from above the table 110.

On the other hand, at the time a slide film is imaged with use of a film stage 200 in combination, the illumination unit holding arm 150 is rotated into a position at the table side as described previously, and the illumination unit 130 takes an attitude where a bottom surface of a casing of the illumination unit 130 is laid over the top surface of the table 110 (sub illuminating attitude, see FIGS. 4 to 7). On the top surface of the table 110, the illumination unit 130 in this sub illuminating attitude irradiates light through a window 132 provided on a slant.

Figure 8:
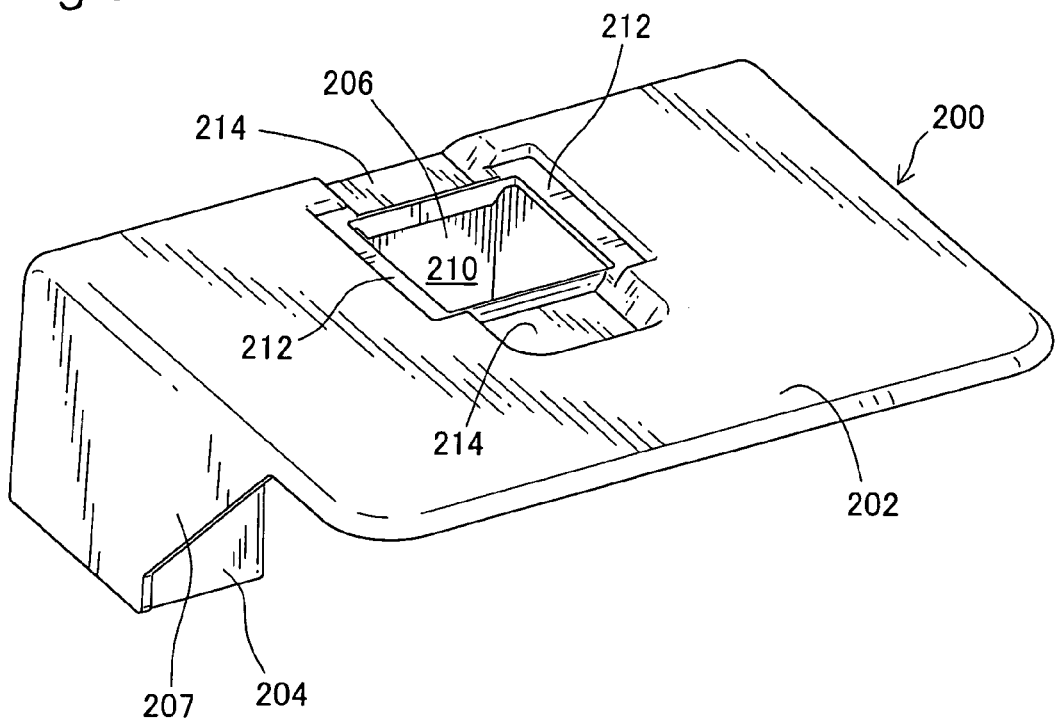
FIG. 8 is a perspective view of the film stage 200.
Figure 9:
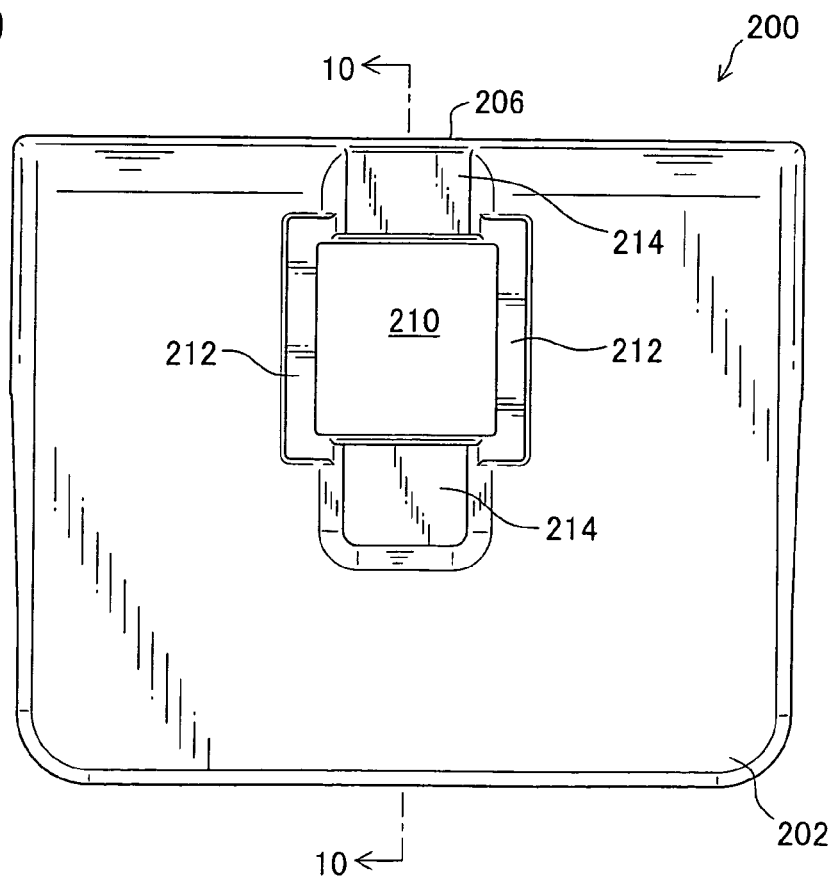
FIG. 9 is a plain view of the film stage 200.
Figure 10:
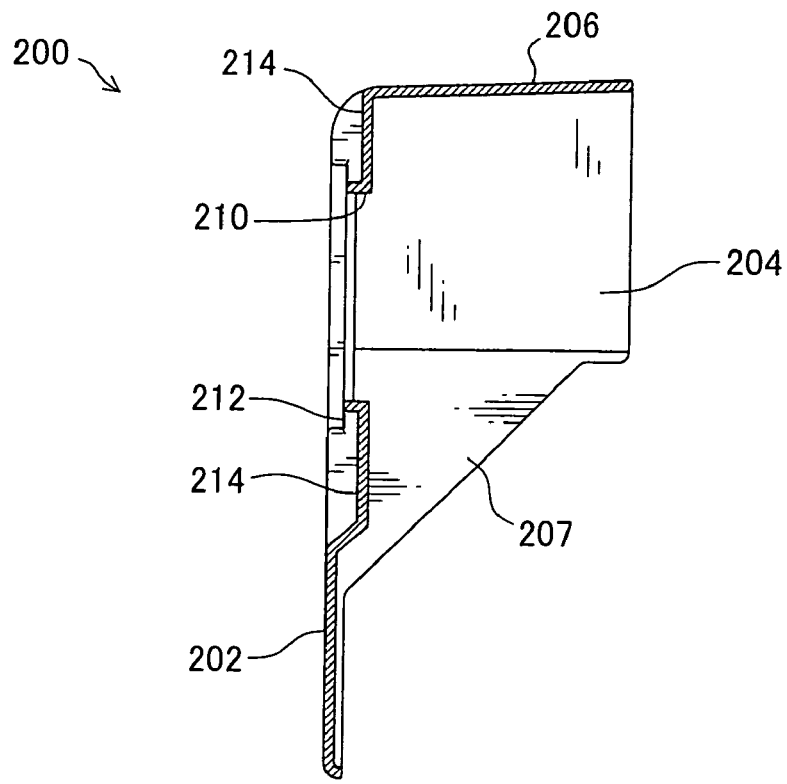
FIG. 10 is a cross sectional view along the line 10-10 of FIG. 9.
Figure 11:
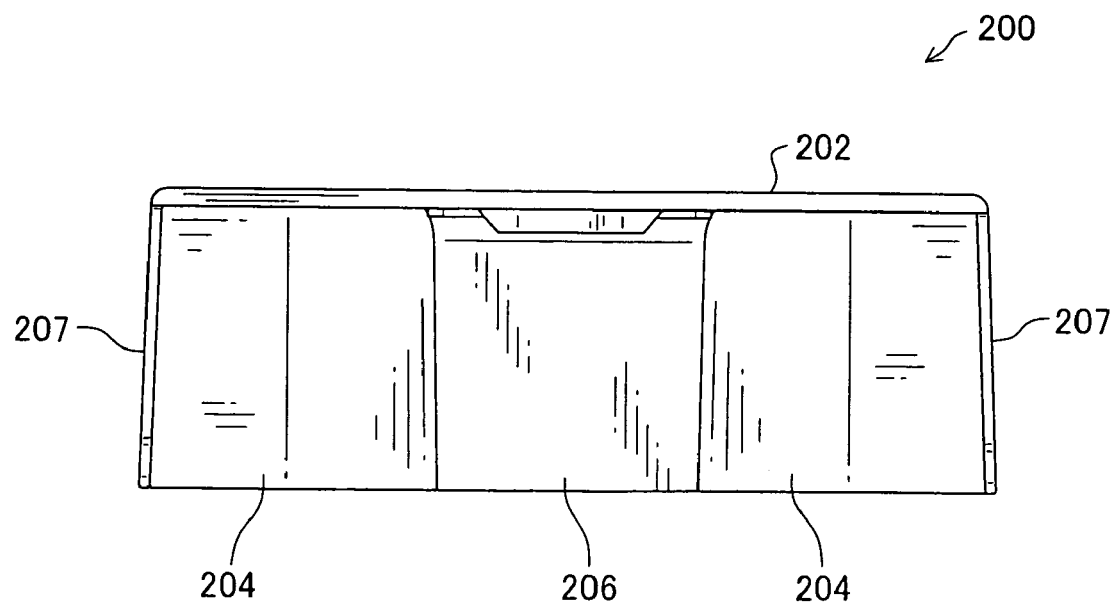
FIG. 11 is a front view of the film stage 200.
Figure 12:
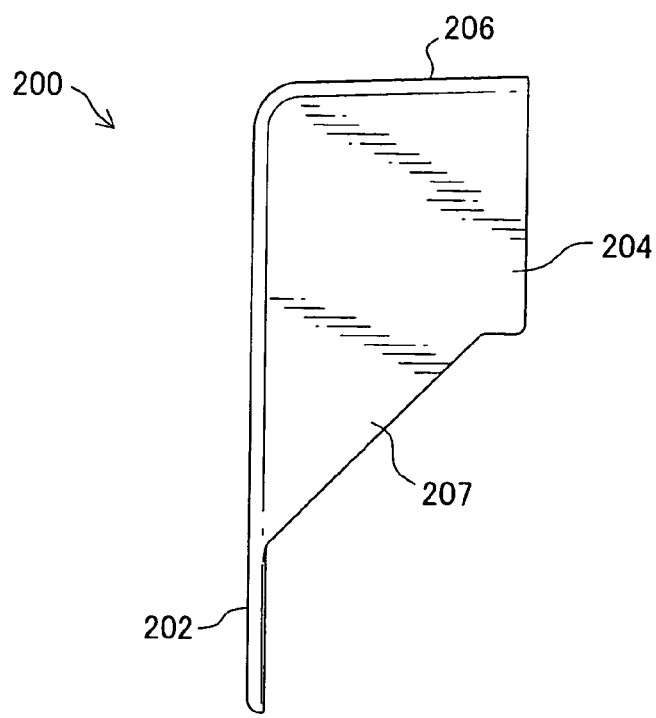
FIG. 12 is a right side view of the film stage 200.
Figure 13:
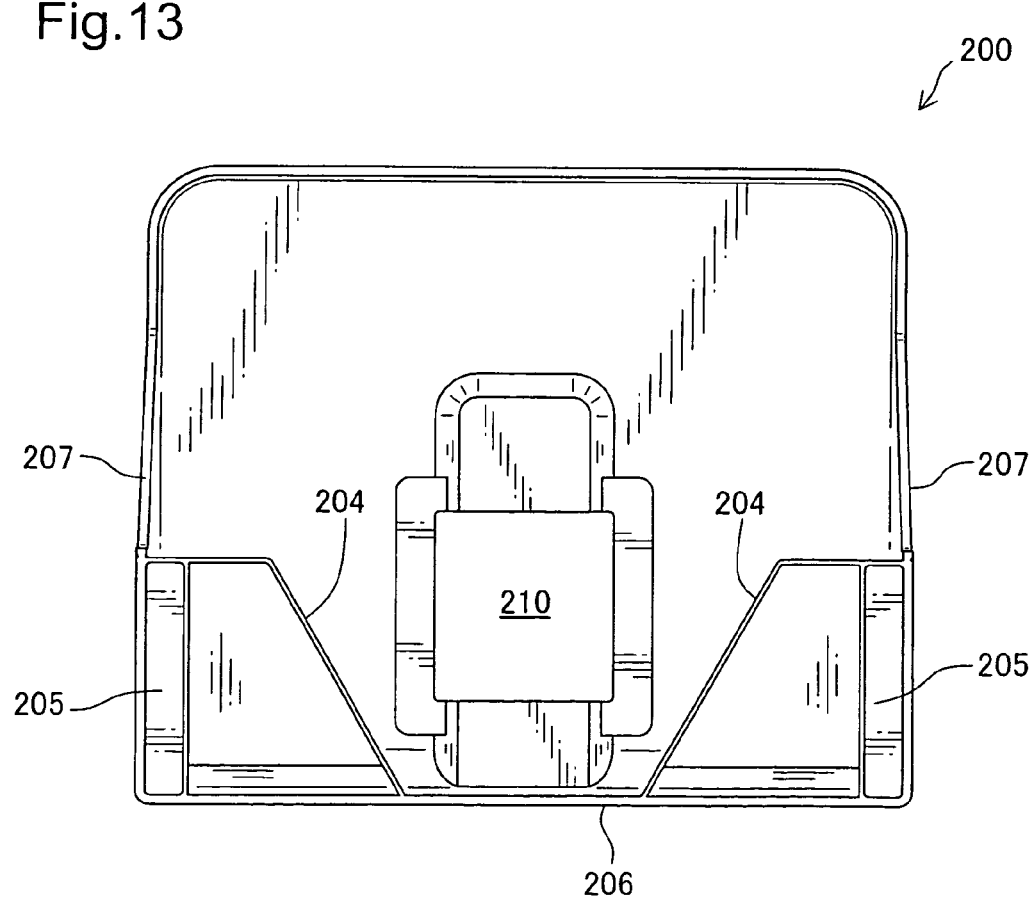
FIG. 13 is a bottom view of the film stage 200.

The following describes the imaging device 100 that takes these illuminating attitudes and the film stage 200 that is used in combination during the slide film imaging. FIG. 8 is a perspective view of the film stage 200; FIG. 9 is a plain view of the film stage 200; FIG. 10 is a cross sectional view along the line 10-10 of FIG. 9; FIG. 11 is a front view of the film stage 200; FIG. 12 is a right side view of the film stage 200; and FIG. 13 is a bottom view of the film stage 200.

As shown in these drawings, the film stage 200 has a tabular stage 202 on its top surface and supports the stage 202 by means of right and left legs 204. The right and left legs 204 are located at one end (rear end) of the stage 202, and under surfaces of the legs 204 are provided with respective cushions 205 that are made of sheets of e.g. rubber, as shown in FIG. 13. In the drawings, the cushions 205 are depicted substantially coplanar with the under surfaces of the legs 204. In actual cases, however, the cushions 205 are slightly protruded from the respective under surfaces of the legs and function as slip stoppers when the film stage 200 is mounted on the table 110 of the imaging device 100.

The film stage 200 is a single molded piece of resin. The stage 200 may be colored e.g. opalescent so that interior surfaces of a rear end tablet 206 and side tablets 207 may be light-scattering.

In the film stage 200, the rear end tablet 206 bridges between the right and left legs 204 at the rear end of the stage 202, and the side tablets 207 respectively extend from front lower ends of the legs to the stage 202 at right and left sides of the stage 202. Therefore, the film stage 200 surrounds the stage 202 with the side tablets 207, the legs 204, and the rear end tablet 206, except for front end of the stage 202 that is open.

The side tablets 207 have respective slanted marginal parts that are configured to conform to the slant of a plate on which the window 132 of the illumination unit 130 is placed. That is, when the film stage 200 is mounted on the table 110 and the front end of the stage 202 is overlapped with and engaged to upper end of the casing of the illumination unit 130 as shown in FIG. 6 and FIG. 7, the slanted marginal parts of the side tablets 207 of the film stage 200 become opposed to the slanted plate around the window 132. As the film stage 200 gets closer to the illumination unit 130, the overlap between the front end of the stage 202 and the upper end of the casing of the illumination unit 130 increases the area and the slanted marginal parts of the side tablets 207 get closer to the slanted plate around the window 132. The film stage 200, therefore, engages to the illumination unit 130 in a manner as described above and thus surrounds the window 132 with the side tablets 207, legs 204, and the rear end tablet 206.

The film stage 200 has an opening 210 of the stage 202 provided between the legs and has a region around the opening 210 as a peripheral recess 212. The film stage 200 also has top and bottom sides of the opening 210 as depressions 214 that are caved deeper than the peripheral recess 212 in a manner continuous with the peripheral recess 212. The peripheral recess 212 is caved substantially into a square-shape that is larger than a frame outline of the slide film (not shown). The opening 210 is configured to have substantially the same size as a film area of the slide film within the frame. Therefore, the opening 210 exposes the film area of the slide film placed in the peripheral recess 212, and forms a path for light that passes through the film from below the stage 202. Since the depressions 214 are caved deeper than the peripheral recess 212, a user of the device can insert his (her) thumb and index finger into the depressions 214 and easily grab the slide film in the peripheral recess 212 at the time of attaching or detaching the slide film to or from the peripheral recess 212. This arrangement makes the attachment and detachment of the slide film simple and convenient. It should be noted herein that the depressions 214 may alternatively be located at right and left sides of the opening 210 in the view of FIG. 9.

The following describes a process of the slide film imaging where the film stage 200 is used in combination. Initially, in the imaging device 100, the illumination unit holding arm 150 is rotated into a position at the table side and the illumination unit 130 is brought into the sub illuminating attitude where the illumination unit 130 is laid over the top surface of the table 110, as shown in FIG. 4 and FIG. 5. Next, the film stage 200 is mounted on the table 110 in a manner opposed to the camera head 120, and the front end of the stage 202 is overlapped with and engaged to the upper end of the casing of the illumination unit 130 that takes the sub illuminating attitude. As a result, the film stage 200 surrounds the window 132 with the side tablets 207, the legs 204, and the rear end tablet 206, with the slanted marginal parts of the side tablets 207 in positions opposed to the slanted plate around the window 132, as shown in FIG. 6 and FIG. 7.

If the illumination unit 130 irradiates light in this mode, then the irradiated light enters the region under the stage 202 of the film stage 200 through the window 132, passes through the opening 210, and reaches the camera head 120. Since the light irradiated by the illumination unit 130 can be used to backlight the slide film set in the stage 202 (specifically, in the peripheral recess 212) in the imaging device 100 of the present embodiment, the slide film can be illuminated from below and can be imaged by the camera head 120. In other words, in the present embodiment, the single illumination unit 130 is sufficient to provide a light source for the slide film imaging.

Therefore, according to the imaging device 100 of the present embodiment, the attitude shift of the illumination unit 130 is sufficient to provide both the illumination for illuminating a target object from above the table and the illumination for backlighting a slide film. As for the illumination unit holding arm 150 that holds the illumination unit 130, all that is required is to hold the illumination unit 130 either in the main illuminating attitude or in the sub illuminating attitude above the table 110, but not to rotate the illumination unit 130 into a position below the table 110. Therefore, according to the present embodiment, the imaging device 100 can be configured as a combination of a form that can be mounted on a platform such as a desk, specifically, a form of tabular table that is suitable to be mounted on a platform, and a form that rotatably holds arms with respect to the table.

The film stage 200 can be engaged to the illumination unit 130 as described above when it is mounted on the table 110, so that the slide film already set in the film stage 200 can be located substantially within the range of imaging attainable by the camera head 120. Since there is a margin for the overlap between the film stage 200 and the upper end of the casing of the illumination unit 130 in the present embodiment, the film stage 200 can be moved backward and forward in view of FIG. 6. Furthermore, the film stage 200 can also be moved leftward and rightward while being overlapped with the illumination unit 130. This arrangement enables a user of the device to adjust the location of the slide film with respect to the camera head 120, that is, the location of the film stage 200 with respect to the camera head 120, while imaging the slide film and watching the image to be taken on an external monitor and the like.

Additionally, in the present embodiment, the film stage 200 is made as a molded piece of resin while the side walls (inner surfaces) of the legs 204, the rear end tablet 206, and the side tablet 207 are configured to be light-scattering. Furthermore, since the window 132 of the illumination unit 130 is provided on a slanted surface, the light irradiated through the window 132 can pass through the opening 210 (specifically, the film area of the slide film in the opening 210) and reach the camera head 120. In this way, a sufficient amount of light can be assured for light that illuminates the slide film already set in the opening 210 from below and reaches the camera head 120, while a sufficient amount of light is also assured in a region under the stage 202 of the film stage 200. Therefore, the slide film can be taken image with a sufficient amount of light.

Furthermore, the film stage 200 is engaged to the illumination unit 130 through the overlapping of the front end of the stage 202 with the upper end of the casing of the illumination unit 130, and surrounds the region under the opening 210 in cooperation with the illumination unit 130. The light irradiated through the window 132 of the illumination unit 130 to the interior of the film stage 200 thus can be used more effectively in the slide film imaging that is carried out in the opening 210.

Figure 14:
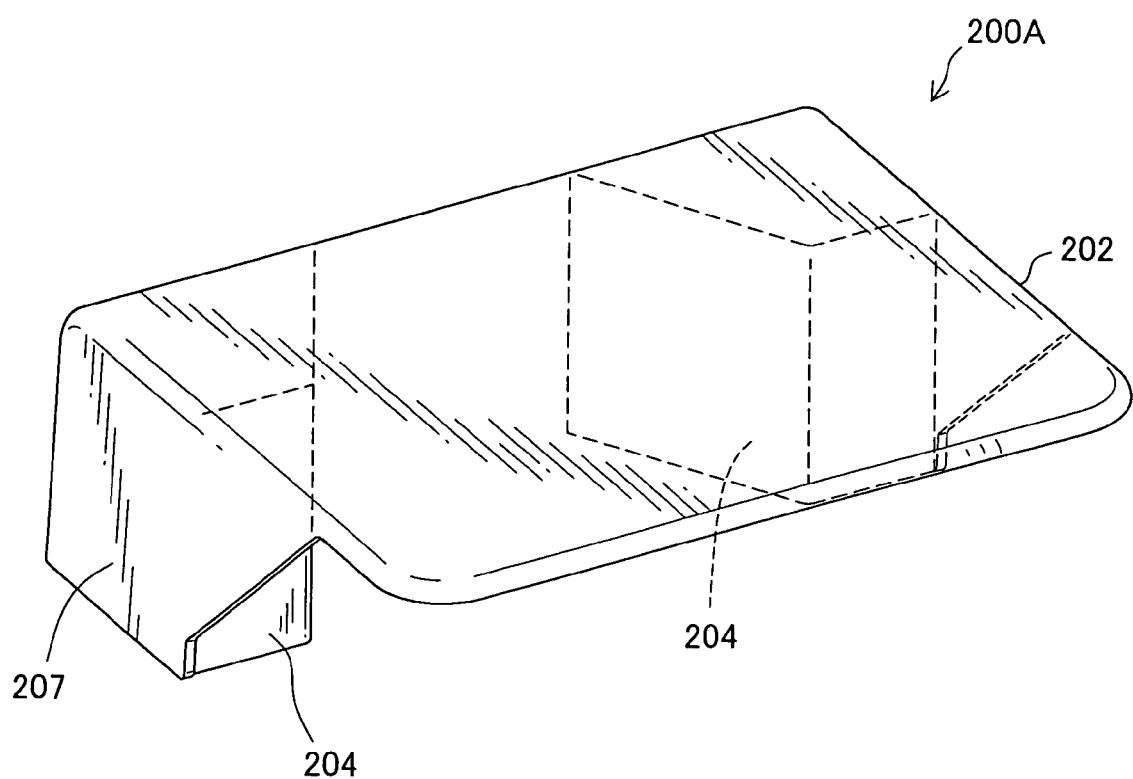
FIG. 14 is a perspective view of a film stage 200A of a modified example.

The following describes a modified example of the above embodiment. Although the film stage 200 is configured to be suitable for the slide film imaging in the above embodiment, the film stage 200 may alternatively be configured as below in case of imaging a translucent target object other than a slide film, such as a translucent sheet, for example. FIG. 14 is a perspective view of a film stage 200A of the modified example.

The film stage 200A of this modification has neither opening 210 nor peripheral recess 212 in the stage 202, and the stage 202 is made tabular. In the meanwhile, the film stage 200A is made of transparent resin, and the stage 202 is also made transparent. The other components such as the legs 204, the rear end tablet 206, and the side tablets 207 have light-scattering sheets on their respective interior surfaces. According to the film stage 200A of this modification, light irradiated by the single illumination unit 130 can be used not only to image a slide film but also to image other translucent target object such as a transparent sheet.

The present invention is not restricted to the above embodiment or its modified example, but there may be a variety of other modifications, changes, and alterations without departing from the scope or spirit of the main characteristics of the present invention. For example, a recess may be provided on a side surface of the table 110 to allow for attachment or detachment of the film stage 200, so that the film stage 200 may be configured to form a part of the table 110. In case of imaging a target object mounted on the table 110, the film stage 200 attached to the recess can be used as a part of the table 110; whereas in case of imaging a slide film, the film stage 200 detached from the recess can be mounted on the table 110. This arrangement makes the storage and management of the film stage 200 simple and convenient.

Additionally, although the illumination unit holding arm 150 that holds the illumination unit 130 is configured to rotatably hold the illumination unit 130 in the above embodiment, the illumination unit holding arm 150 may alternatively be configured as below. For example, the illumination unit holding arm 150 may be configured to be extendable so that the height of the illumination unit 130 may be adjustable. When extended, the illumination unit holding arm 150 may bring the illumination unit 130 into the main illuminating attitude above the table 110; whereas when contracted, the illumination unit holding arm 150 may bring the illumination unit 130 into the sub illuminating attitude close to the table top surface.

Additionally, the film stage 200 may alternatively be configured as below. For example, the peripheral recess 212 shown in FIG. 8 may be an elongated recess that extends rightward and leftward in the view of FIG. 8 to respective edges of the stage 202. Since a slip of negative film can be mounted in this elongated recess, a negative image can be taken for each frame of the negative film slip by means of the camera head 120 and then the obtained negative image can be reversed to provide a corresponding positive image.

What is claimed is:

1. An imaging device comprising:
   a camera head that images an imaging-area of a table on which an imaging-object is laid;
   an illumination unit that illuminates the imaging-area;
   an illumination unit holding arm that holds the illumination unit on the table such that the illumination unit can take a main attitude where the illumination unit illuminates the imaging-area from above the table and a sub attitude where the illumination unit gets close to a top surface of the table; and
   a stage forming member that is mounted on imaging-area in a manner opposed to the camera head, the stage forming member forming a stage, on which an imaging-object can be laid, apart from a top surface of the table, and the stage including a translucent portion that allows for transmission of light,
   wherein the illumination unit irradiates interior of the stage forming member with light when the illumination unit takes the sub attitude.

2. The imaging device according to claim 1, wherein the stage forming member has an interior wall which scatters the light that entered the interior of the stage forming member, and
   the illumination unit has an illumination window that allows for irradiation of light through the translucent portion toward the camera head.

3. The imaging device according to claim 1, wherein the stage forming member engages to the illumination unit in the sub attitude and surrounds a region under the translucent portion in cooperation with the illumination unit.

4. The imaging device according to claim 3, wherein the stage forming member has a recess that is provided in the stage and can have a slide film mounted therein and an opening that is provided as the translucent portion in the recess and exposes at least a film area of the slide film.

5. The imaging device according to claim 4, further comprising depressions that are deeper than the recess and are formed at both sides of the opening in a manner continuous with the recess.

6. A stage for slide film imaging that is used in an imaging device having a camera head that images an imaging-area of table and an illumination unit that illuminates the imaging-area, the stage comprising:
- a body that is mounted on the table in a manner opposed to the camera head and forms a stage, on which an imaging-object can be laid, at the body top such as apart from a top surface of the table, the body having a lateral opening that is formed on a side surface of the body and is used to guide light into interior of the body; and
- a recess that is formed in the stage and can have a slide film mounted therein, the recess having a recess opening that is formed in the recess and can expose at least a film area of the slide film;
- wherein the body engages to the illumination unit that irradiates light at a position close to a top surface of the table, and surrounds a region under the recess opening in cooperation with the illumination unit, thereby causes the light irradiated by the illumination unit to enter the interior of the body through the lateral opening.

7. The stage for slide film imaging according to claim 6, further comprising depressions that are deeper than the recess and are formed at both sides of the recess opening in a manner continuous with the recess.

8. The imaging device according to claim 2, wherein the stage forming member engages to the illumination unit in the sub attitude and surrounds a region under the translucent portion in cooperation with the illumination unit.

9. The imaging device according to claim 8, wherein the stage forming member has a recess that is provided in the stage and can have a slide film mounted therein and an opening that is provided as the translucent portion in the recess and exposes at least a film area of the slide film.

10. The imaging device according to claim 9, further comprising depressions that are deeper than the recess and are formed at both sides of the opening in a manner continuous with the recess.

* * * * *